US011735955B2

(12) United States Patent
Zenkner

(10) Patent No.: US 11,735,955 B2
(45) Date of Patent: Aug. 22, 2023

(54) RESONANT CIRCUIT FOR TRANSMITTING ELECTRIC ENERGY

(71) Applicant: Hilti Aktiengesellschaft, Schaan (LI)

(72) Inventor: Heinz Zenkner, Chiang Mai (TH)

(73) Assignee: Hilti Aktiengesellschaft, Schaan (LI)

( * ) Notice: Subject to any disclaimer, the term of this patent is extended or adjusted under 35 U.S.C. 154(b) by 202 days.

(21) Appl. No.: 16/754,341

(22) PCT Filed: Oct. 25, 2018

(86) PCT No.: PCT/EP2018/079249
§ 371 (c)(1),
(2) Date: Apr. 7, 2020

(87) PCT Pub. No.: WO2019/086319
PCT Pub. Date: May 9, 2019

(65) Prior Publication Data
US 2020/0336011 A1    Oct. 22, 2020

(30) Foreign Application Priority Data

Nov. 3, 2017  (EP) ..................................... 17199857

(51) Int. Cl.
*H02J 50/12* (2016.01)
*H02J 50/40* (2016.01)
(Continued)

(52) U.S. Cl.
CPC .............. *H02J 50/12* (2016.02); *H01F 27/24* (2013.01); *H01F 27/28* (2013.01); *H01F 38/14* (2013.01); *H02J 7/02* (2013.01); *H02J 50/40* (2016.02)

(58) Field of Classification Search
CPC ... H02J 50/12; H02J 50/40; H02J 7/02; H01F 27/24; H01F 27/28; H01F 38/14; H01F 29/025
See application file for complete search history.

(56) References Cited

U.S. PATENT DOCUMENTS

| 7,919,886 B2 | 4/2011 | Tanaka et al. |
| 10,298,069 B2 | 5/2019 | Ohnishi et al. |

(Continued)

FOREIGN PATENT DOCUMENTS

| CN | 102201702 A | 9/2011 |
| CN | 202206194 U | 4/2012 |

(Continued)

OTHER PUBLICATIONS

Impedance Transformers for Compact and Robust Coupled Magnetic Resonance Systems, Eunsoo Lee, Xuan Thai, Suyong Choi, Chuntaek Rim, (78-1-4799-0336-8/13) IEEE (Year: 2013).*

(Continued)

*Primary Examiner* — Lincoln D Donovan
*Assistant Examiner* — Alex W Lam
(74) *Attorney, Agent, or Firm* — Davidson, Davidson & Kappel, LLC

(57) ABSTRACT

An apparatus for transmitting electrical energy to an electrical consumer, includes a transmitter device for transmitting an electrical energy having at least one first coil and a first capacitor for producing a resonant tank circuit at the transmitter device; at least one receiver device for receiving the energy transmitted by the transmitter device, including a second coil and a capacitor for producing a resonant tank circuit at the receiver device, wherein the receiver device is connectable to the consumer to form an electrical connection; a power amplifier; a transformer for matching the impedance between the resonant tank circuit at the receiver device and the consumer; and an electrical energy source— for supplying the resonant tank circuit at the transmitter device with electrical energy. The transmitter device and the receiver device jointly form a resonant tank circuit for transferring the electrical energy from the transmitter device to the receiver device, such that at the receiver device the (Continued)

electrical energy made available by the transmitter device can be fed to the consumer.

19 Claims, 15 Drawing Sheets

(51) Int. Cl.
*H02J 7/02* (2016.01)
*H01F 27/24* (2006.01)
*H01F 27/28* (2006.01)
*H01F 38/14* (2006.01)

(56) References Cited

U.S. PATENT DOCUMENTS

| | | | |
|---|---|---|---|
| 2003/0030530 A1* | 2/2003 | Reinhard | H02J 50/10 336/182 |
| 2007/0252441 A1 | 11/2007 | Hirase et al. | |
| 2009/0058190 A1 | 3/2009 | Tanaka et al. | |
| 2009/0085408 A1 | 4/2009 | Bruhn et al. | |
| 2010/0187913 A1 | 7/2010 | Sample et al. | |
| 2010/0312310 A1 | 12/2010 | Meskens | |
| 2011/0080052 A1 | 4/2011 | Sato | |
| 2011/0248727 A1 | 10/2011 | Krumme et al. | |
| 2011/0304216 A1* | 12/2011 | Baarman | H02J 7/00308 307/104 |
| 2012/0223585 A1 | 9/2012 | Urano et al. | |
| 2013/0176653 A1* | 7/2013 | Kim | H02J 50/10 361/91.6 |
| 2013/0223640 A1 | 8/2013 | Urano et al. | |
| 2013/0234529 A1* | 9/2013 | Miyauchi | H02J 7/025 307/104 |
| 2014/0159501 A1 | 6/2014 | Asanuma et al. | |
| 2015/0123761 A1* | 5/2015 | Winkler | H01F 27/24 336/221 |
| 2016/0043576 A1* | 2/2016 | Jin | H02J 5/005 307/104 |
| 2017/0005525 A1 | 1/2017 | Lecias et al. | |
| 2017/0187230 A1 | 6/2017 | Tschirhart et al. | |
| 2017/0187238 A1* | 6/2017 | Chong | H02J 50/50 |
| 2018/0090995 A1 | 3/2018 | Arasaki et al. | |
| 2018/0254672 A1* | 9/2018 | Du | H02J 50/80 |
| 2020/0313461 A1 | 10/2020 | Zenkner | |

FOREIGN PATENT DOCUMENTS

| | | |
|---|---|---|
| CN | 203707858 U | 7/2014 |
| CN | 104659930 A | 5/2015 |
| DE | 102015107957 A | 12/2015 |
| EP | 2031731 A1 | 3/2009 |
| EP | 2306617 A1 | 4/2011 |
| EP | 2306617 A1 | 4/2011 |
| JP | H02179232 A | 7/1990 |
| JP | H11243024 A | 9/1999 |
| JP | 2003250233 A | 9/2003 |
| JP | 2009060736 A | 3/2009 |
| JP | 2012023957 A | 2/2012 |
| JP | 2012023957 A | 2/2012 |
| JP | 2012110154 A | 6/2012 |
| JP | 2012139011 A | 7/2012 |
| JP | 2015116023 A | 6/2015 |
| JP | 2016187260 A | 10/2016 |
| JP | 2017511101 | 4/2017 |
| JP | 2017147820 A | 8/2017 |
| WO | WO 2006022365 A1 | 3/2006 |
| WO | WO 2014068992 A1 | 5/2014 |
| WO | WO 2014136257 A1 | 9/2014 |
| WO | WO 2015097811 A1 | 7/2015 |
| WO | WO 2016135893 A1 | 9/2016 |
| WO | WO2016159093 A1 | 10/2016 |
| WO | WO2017094466 | 2/2018 |

OTHER PUBLICATIONS

Sokal, N., 2001. Class-E RF Power Amplifiers, [online] People.physics.anu.edu.au. Available at: <https://people.physics.anu.edu.au/~dxt103/160m/class_E_amplifier_design.pdf> [Year: 2001].*
International Search Report of PCT/EP2018/079249, dated Nov. 27, 2018.
Artit Rittiplang and Wanchai Pijitrojana: "Low Frequency Wireless Power Transfer using Optimal Primary Capacitance of Parallel resonance for Impedance Matching," IJIREEICE, vol. 4, Issue 1, Jan. 2016.
Christian Poetter:Drahtlose Energieuebertragung, Facharbeit im Leistungkurz Physik, Staedtisches Gymnasium Sundern, 31. Mar. 2009, See English Summary.
Dominik Huwig: "Energieubertragung durch Nahfeldkopplung," Nov. 1, 2014, See English Summary.
Dominik Huwig et al.: "Modulares Plattformkonzept für die kontaktlose Übertragung von Energie und Daten," RRC power solutions GmbH, see machine translation.
Thue Phi Puong et al.:"A Dynamically Adaptable Impedance-Matching System for Midrange Wireless Power Transfer with Misalignment," Energies 2015, 8, 7593-7617, ISSN 1996-1073, published Jul. 27, 2015.

* cited by examiner

RESONANT CIRCUIT FOR TRANSMITTING ELECTRIC ENERGY

The present invention relates to an apparatus for transmitting electrical energy to at least one electrical consumer, for example a rechargeable battery, comprising at least one transmitter device for transmitting an electrical energy having at least one first coil and at least one first capacitor for producing a resonant tank circuit at the transmitter device, at least one receiver device for receiving the energy transmitted by the transmitter device, comprising at least one second coil and at least one second capacitor for producing a resonant tank circuit at the receiver device, wherein the receiver device is connectable to the consumer to form an electrical connection, a power amplifier, a transformer for matching the impedance between the resonant tank circuit at the receiver device and the consumer, and an electrical energy source, in particular an AC voltage source, for supplying the resonant tank circuit at the transmitter device with electrical energy.

BACKGROUND

The wireless transfer of an electrical energy from a transmitter to a receiver, for example in the form of an inductive transfer, has already been known for a relatively long time.

SUMMARY OF THE INVENTION

However, what is problematic about apparatuses in accordance with the prior art for wireless energy transfer is the relatively high energy loss during the transfer, with the result that it is not possible to achieve a high or at least a sufficient efficiency during the transfer.

It is an object of the present invention to provide an apparatus with which it is possible to achieve a wireless energy transfer with high efficiency.

The present invention provides an apparatus for transmitting electrical energy to at least one electrical consumer, for example a rechargeable battery, comprising at least one transmitter device for transmitting an electrical energy having at least one first coil and at least one first capacitor for producing a resonant tank circuit at the transmitter device, at least one receiver device for receiving the energy transmitted by the transmitter device, comprising at least one second coil and at least one second capacitor for producing a resonant tank circuit at the receiver device, wherein the receiver device is connectable to the consumer to form an electrical connection, a power amplifier, a transformer for matching the impedance between the resonant tank circuit at the receiver device and the consumer, and an electrical energy source, in particular an AC voltage source, for supplying the resonant tank circuit at the transmitter device with electrical energy.

The invention provides for the transmitter device and the receiver device jointly to form a series resonant tank circuit for transferring the electrical energy from the transmitter device to the receiver device, such that at the receiver device the electrical energy made available by the transmitter device can be fed to the consumer. As a result, electrical energy can be transferred in an efficient way.

In this case, the consumer can be configured in the form of a load, an electrical resistor, a storage device, an energy store, a convertor or in the form of other components that can make the energy fed useable for their function.

The invention is based on the principle of inductive coupling with two resonant high-efficiency resonance tank circuits, wherein a first tank circuit is fed with correspondingly high-frequency energy such that the high-frequency energy is transferred to the second tank circuit in order to make it available to an electrical consumer. Since the first tank circuit is highly resonant, the electrical energy situated in the tank circuit decreases only relatively slowly over many oscillation cycles. The electrical energy is taken up by the second tank circuit, however, if the two tank circuits do not exceed a predetermined distance with respect to one another.

The transformer can also be referred to as a matching transformer.

The resonant tank circuit can also be referred to as a resonance circuit.

The power amplifier serves as a clock generator for the frequency of the resonant tank circuit at the transmitter device. In this case, the power amplifier is configured such that either a low-impedance or a high-impedance energy source is produced for the resonant tank circuit at the transmitter device.

In accordance with a further advantageous embodiment of the present invention, provision can be made for the first coil and the first capacitor of the transmitter device to be connected in parallel with one another in order to produce a parallel resonant tank circuit at the transmitter device. In this case, it is possible for the second coil and the second capacitor of the receiver device to be connected in series with one another in order to produce a series resonant tank circuit at the receiver device. As a result, a high electrical voltage value and a low electrical current value can be generated at the transmitter device. This arrangement is advantageous particularly in the case of a high-impedance energy source for supplying the transmitter device.

In accordance with a further advantageous embodiment, it can be possible for the second coil and the second capacitor of the receiver device to be connected in parallel with one another in order to produce a parallel resonant tank circuit at the receiver device. The parallel resonant tank circuit at the receiver device has a high impedance in this case. It is possible here for the first coil and the first capacitor of the transmitter device to be connected in series with one another in order to produce a series resonant tank circuit at the transmitter device. As a result, it is possible to produce a greater ratio of a first winding to a second winding at the transformer. Moreover, a higher voltage value and at the same time a low current value can be generated at the receiver device and an energy loss at the second coil of the receiver device can be reduced as a result.

In accordance with a further embodiment, it can be advantageous for both the first and the second coil to contain a ferrite core having a resistivity of $10^5$ to $10^6$ $\Omega$m and also a magnetic permeability of 50 to 500, in particular 125. As a result, the resonant tank circuit at the receiver device can be produced in an efficient manner, with the result that a high amount of energy can be transmitted from the transmitter device to the receiver device.

It is furthermore also possible for the ferrite core at least partly to contain nickel-zinc alloy (NiZn). As a result, the resonant tank circuit at the receiver device can be produced in an efficient manner, with the result that a high amount of energy can be transmitted from the transmitter device to the receiver device.

Furthermore, in accordance with a further embodiment, it can also be possible for the ferrite core to be configured in a U-shaped fashion and to have a cross-sectional area of 5.65 cm$^2$, such that a power density of 35 W/cm$^2$, for an input power of 200 W, is achievable during the transfer of the electrical energy from the transmitter device to the receiver device. As a result, the resonant tank circuit at the receiver device can be produced in an efficient manner, with the result that a high amount of energy can be transmitted from the transmitter device to the receiver device.

In accordance with a further embodiment, it can be advantageous for the frequency of the resonant tank circuit at the transmitter device to be between 2 and 30 MHz, in particular between 6.765 and 6.795 MHz, for example to be 6.78 MHz. As a result, the resonant tank circuit at the receiver device can be produced in an efficient manner, with the result that a high amount of energy can be transmitted from the transmitter device to the receiver device.

For tuning the resonant frequency in the resonant tank circuit at the transmitter device and/or in the resonant tank circuit at the receiver device, in accordance with a further embodiment, it can be possible for the transmitter device and/or the receiver device to comprise a variable capacitor, for example a trimmer capacitor. Alternatively, the transmitter device and/or the receiver device can also comprise, instead of a trimmer capacitor, an adequately acting electronic circuit for tuning the resonant frequency.

In accordance with a further embodiment, it can be advantageous for the receiver device to comprise a transformer for increasing the efficiency by impedance matching and also for decoupling between the resonant tank circuit at the receiver device and the consumer. Alternatively, the transformer can also be configured as an integrated transformer.

In accordance with a further advantageous embodiment of the present invention, the transformer can be integrated as an additional winding concomitantly on the resonant tank circuit at the receiver device.

In accordance with a further advantageous embodiment of the present invention, it is also possible for the ferrite core of the first coil and/or the second coil to be configured in a wide variety of shapes. By virtue of the variety of shapes of the ferrite core, the incorporation of the apparatus according to the invention in a housing can be adapted to specific geometric stipulations and in particular to a possible space deficiency.

BRIEF DESCRIPTION OF THE DRAWINGS

In the figures, identical components and components of identical type are designated by identical reference signs.

In the Figures.

DETAILED DESCRIPTION

FIGS. 1 to 8 shows schematic circuit diagrams of the apparatus 1 according to the invention for transmitting an electrical energy from a transmitter device 2 to a receiver device 3 in accordance with various exemplary embodiments.

In this case, the apparatus 1 according to the invention substantially comprises a transmitter device 2 and a receiver device 3.

The transmitter device 2 serves for taking up an electrical energy and also for transmitting or transferring an electrical energy to the receiver device 3. For supply with electrical energy, the transmitter device 2 is connected to an electrical energy source. The supply with electrical energy is effected in the form of an AC source. The energy source is not illustrated in the figures.

The receiver device 3 serves in turn for receiving the transmitted electrical energy, processing and also for forwarding to an electrical consumer 4. In this case, the electrical consumer 4 can be configured for example as a rechargeable battery with an integrated rectifier. The rectifier serves for converting the AC voltage generated at the receiver device 3 into a DC voltage.

However, it is also possible here for the consumer 4 merely to be configured as an electrical resistor. The electrical consumer 4 configured as a rechargeable battery is connectable to the receiver device 3 optionally and in a re-releasable manner in order to be supplied with electrical current or to charge the rechargeable battery with electrical energy. In accordance with this configuration, the apparatus 1 according to the invention serves as a charging apparatus for the consumer 4 configured as a rechargeable battery.

Figure 1:
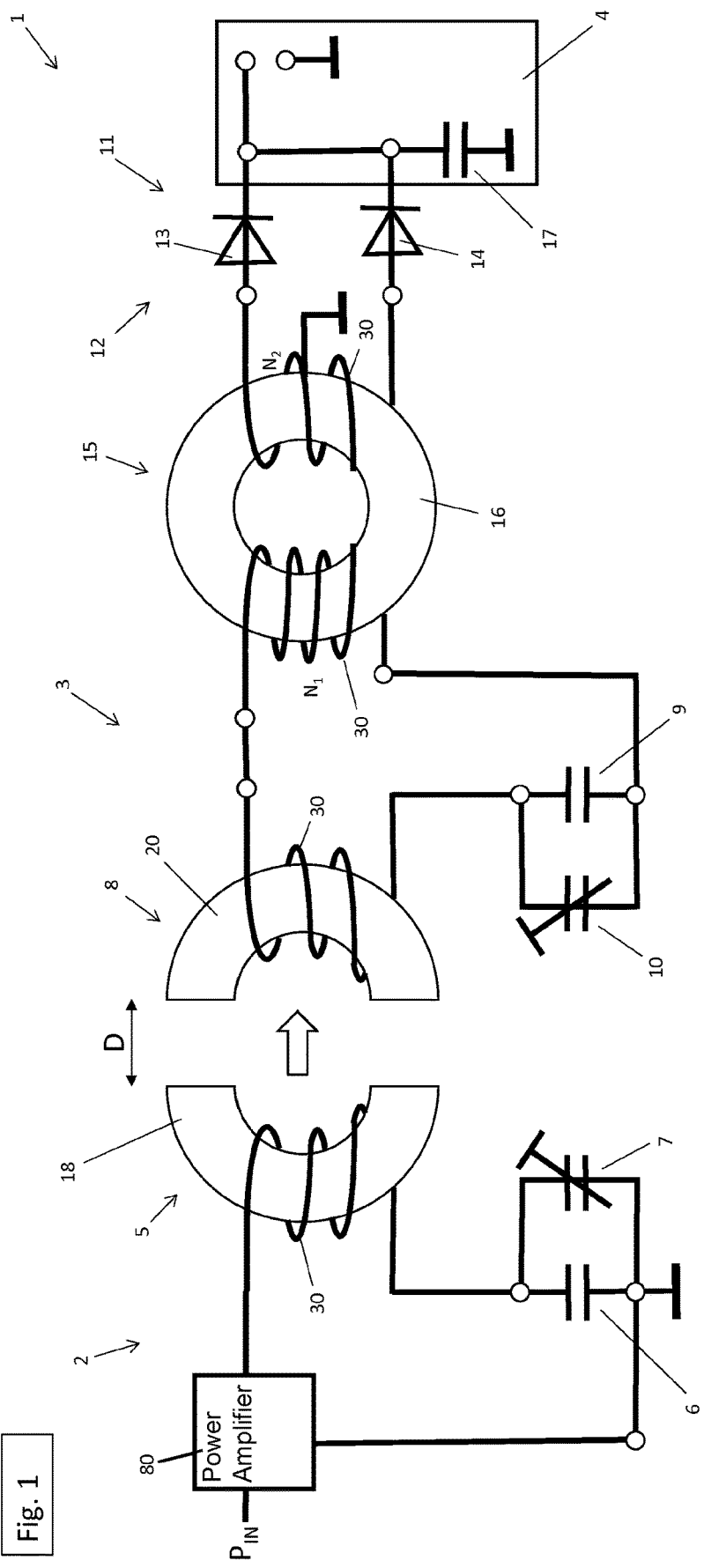
FIG. 1 shows a schematic circuit diagram in accordance with a first embodiment according to the invention, wherein a transmitter device comprises a series tank circuit and a receiver device comprises a series tank circuit, with connection of a transformer with a center tap and a rectifier as double-pulse center-tap rectifier.

FIG. 1 shows a schematic circuit diagram in accordance with a first embodiment of the apparatus 1 according to the invention. As already mentioned above, the apparatus 1 in this case substantially comprises the transmitter device 2 and the receiver device 3.

The transmitter device 2 comprises a first coil 5 and a first capacitor 6. In this case, the first coil 5 and the first capacitor 6 are connected in series with one another such that a first resonant tank circuit is formed. The first resonant tank circuit is accordingly a series resonant tank circuit. This first resonant tank circuit is also referred to as transmitter resonance circuit. Furthermore, the transmitter device 2 can comprise a first trimming capacitor 7, which serves for setting the capacitance or the resonant frequency in the transmitter device 2. The first trimming capacitor 7 can also be referred to as a variable capacitor.

The receiver device 3 in accordance with the first embodiment of the apparatus 1 according to the invention comprises a second coil 8 and a second capacitor 9. In this case, the second coil 8 and the second capacitor 9 are connected in series with one another such that a second resonant tank circuit is formed. The second resonant tank circuit is accordingly a series resonant tank circuit. This second resonant tank circuit is also referred to as receiver resonance circuit. Furthermore, the receiver device 3 can comprise a second trimming capacitor 10, which serves for setting the capacitance or the resonant frequency in the receiver device 3. The second trimming capacitor 10 can also be referred to as a variable capacitor.

The apparatus 1 in accordance with the first embodiment furthermore comprises a rectifier 11 for converting the AC voltage generated at the receiver device 3 into a DC voltage. In accordance with the first embodiment, the rectifier 11 is configured as a double-pulse center-tap rectifier. The rectifier 11 comprises a double-pulse center-tap connection 12 comprises a first diode 13 and a second diode 14. The double-pulse center-tap connection 12 serves for producing a higher efficiency. Instead of the rectifier 11 having the double-pulse center-tap connection 12, in accordance with an alternative embodiment, it is also possible merely to use a rectifier 11 two diodes. Alternatively, any other suitable type of rectifier can also be used.

Furthermore, the first embodiment of the apparatus 1 according to the invention comprises a transformer 15 connected to the receiver device 3. The transformer 15 serves for matching the electrical voltage and substantially comprises a circular ferrite core 16 in accordance with the embodiments shown in the figures. At the ferrite core 16 of the transformer 15, a first winding $N_1$ is positioned at one side and a second winding $N_2$ is positioned at a second side. In this case, the first winding $N_1$ has a first wire winding number and the second winding $N_2$ has a second wire winding number. The first winding $N_1$ contains a higher wrapping number than the second winding $N_2$.

Figure 2:
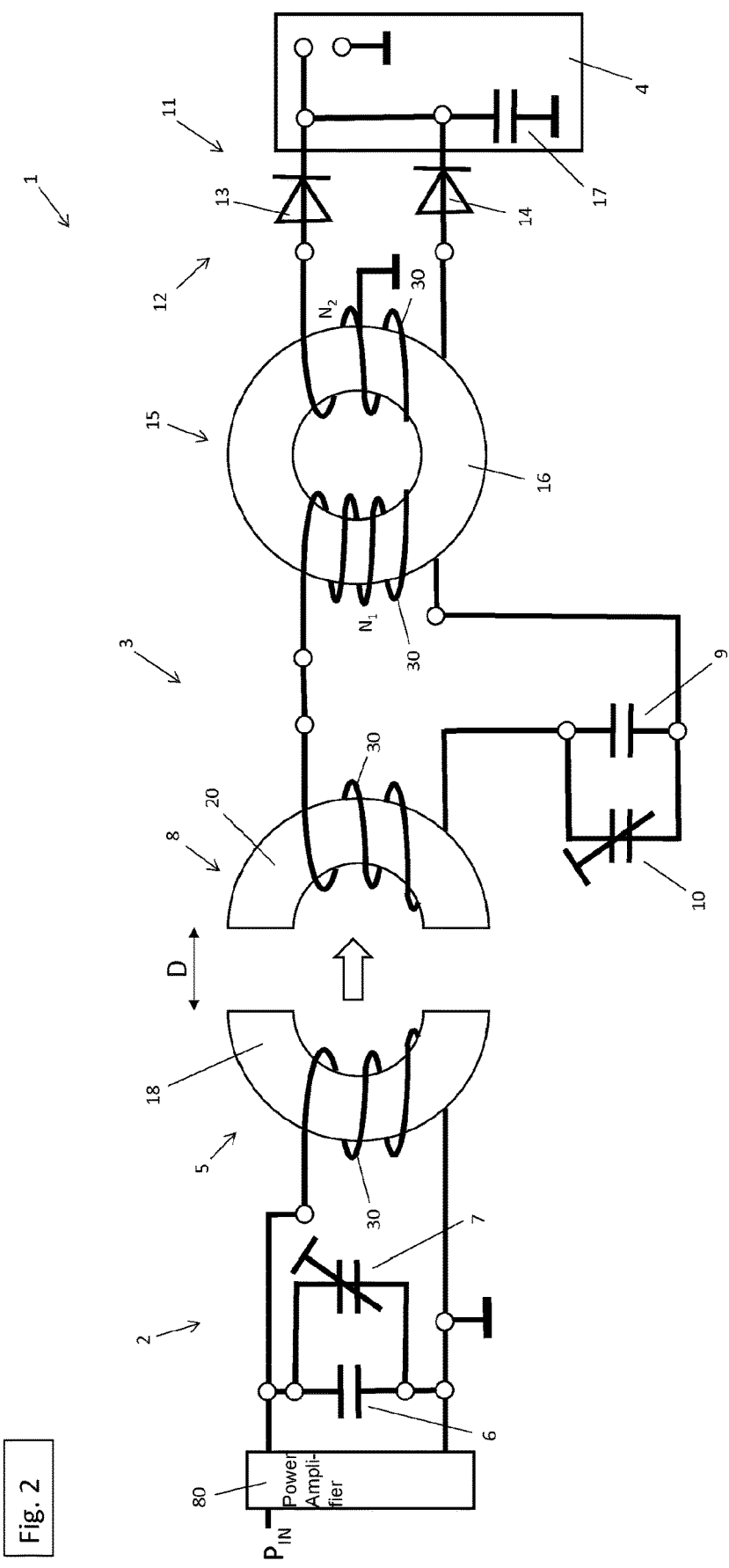
FIG. 2 shows a schematic circuit diagram in accordance with a second embodiment according to the invention, wherein the transmitter device comprises a parallel tank circuit and the receiver device comprises a series tank circuit, with connection of a transformer with a center tap and a rectifier as double-pulse center-tap rectifier.

FIG. 2 illustrates a schematic circuit diagram of the apparatus 1 according to the invention in accordance with a second embodiment. In this case, the apparatus 1 in accordance with the second embodiment substantially corresponds to the apparatus 1 in accordance with the first embodiment in FIG. 1. The apparatus 1 in accordance with the second embodiment differs from the apparatus 1 in accordance with the first embodiment in that the first coil 5 and the first capacitor 6 of the transmitter device 2 are connected in parallel with one another, with the result that a parallel resonant tank circuit is produced. The receiver device 3 in accordance with the second embodiment of the apparatus 1 according to the invention additionally comprises a second coil 8 and a second capacitor 9 connected in series (i.e. serially) with one another, with the result that a series resonant tank circuit is formed.

Figure 3:
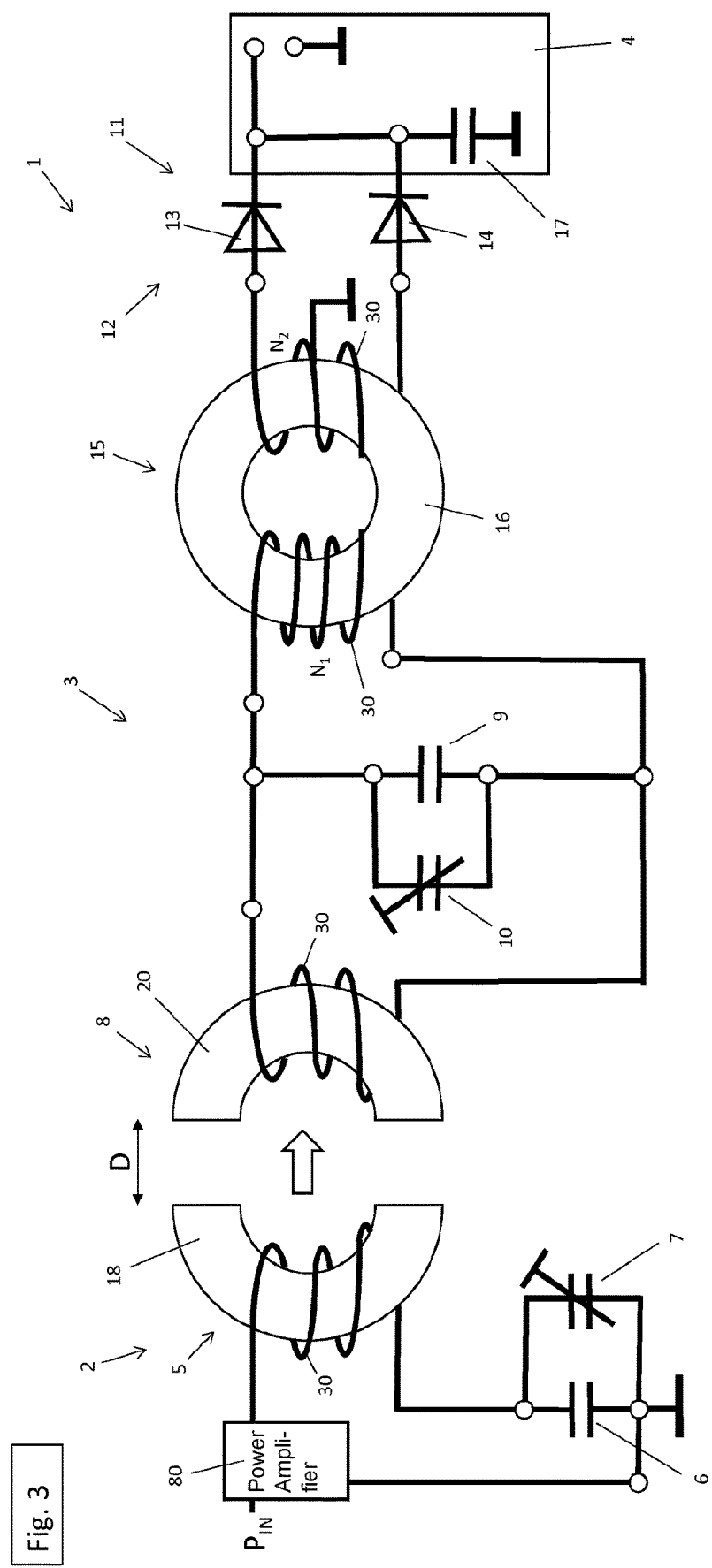
FIG. 3 shows a schematic circuit diagram in accordance with a third embodiment according to the invention, wherein the transmitter device comprises a series tank circuit and the receiver device comprises a parallel tank circuit, with connection of a transformer with a center tap and a rectifier as double-pulse center-tap rectifier.

FIG. 3 shows a schematic circuit diagram of the apparatus 1 according to the invention in accordance with a third embodiment. In this case, the apparatus 1 in accordance with the third embodiment substantially corresponds to the apparatus 1 in accordance with the first or second embodiment in FIG. 1 or FIG. 2, respectively. The apparatus 1 in accordance with the third embodiment differs from the apparatus 1 in accordance with the first or second embodiment in that the first coil 5 and the first capacitor 6 of the transmitter device 2 are connected in series (i.e. serially) with one another, with the result that a series resonant tank circuit is produced. The receiver device 3 in accordance with the third embodiment of the apparatus 1 according to the invention additionally comprises a second coil 8 and a second capacitor 9 connected in parallel with one another, with the result that a parallel resonant tank circuit is formed.

Figure 4:
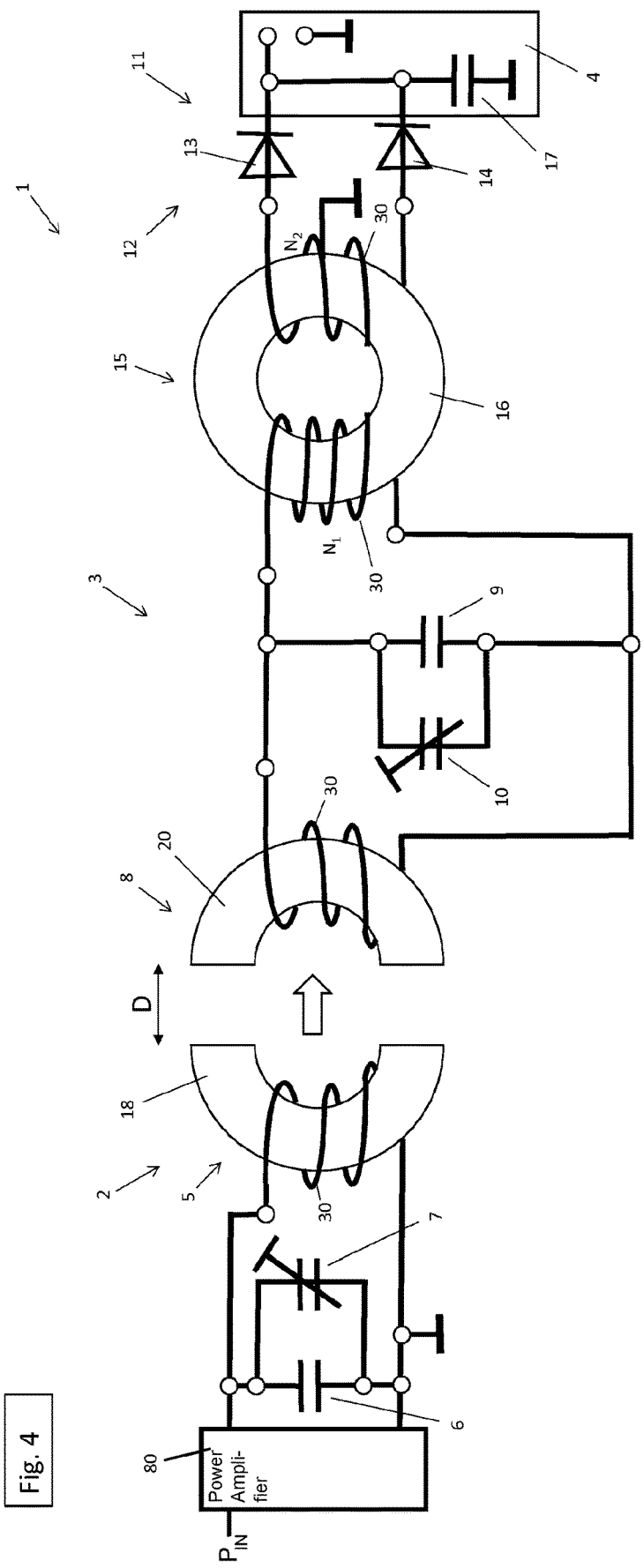
FIG. 4 shows a schematic circuit diagram in accordance with a fourth embodiment according to the invention, wherein the transmitter device comprises a parallel tank circuit and the receiver device comprises a parallel tank circuit, with connection of a transformer with a center tap and a rectifier as double-pulse center-tap rectifier.

FIG. 4 illustrates a schematic circuit diagram of the apparatus 1 according to the invention in accordance with a fourth embodiment. In this case, the apparatus 1 in accordance with the fourth embodiment substantially corresponds to the apparatus 1 in accordance with the first, second or third embodiment correspondingly illustrated in FIGS. 1 to 3. The apparatus 1 in accordance with the fourth embodiment differs from the apparatus 1 in accordance with the first, second or third embodiment in that the first coil 5 and the first capacitor 6 of the transmitter device 2 are connected in parallel with one another, with the result that a parallel resonant tank circuit is produced. The receiver device 3 in accordance with the second embodiment of the apparatus 1 according to the invention in turn comprises a second coil 8 and a second capacitor 9 connected in parallel with one another, with the result that a parallel resonant tank circuit is formed.

Figure 5:
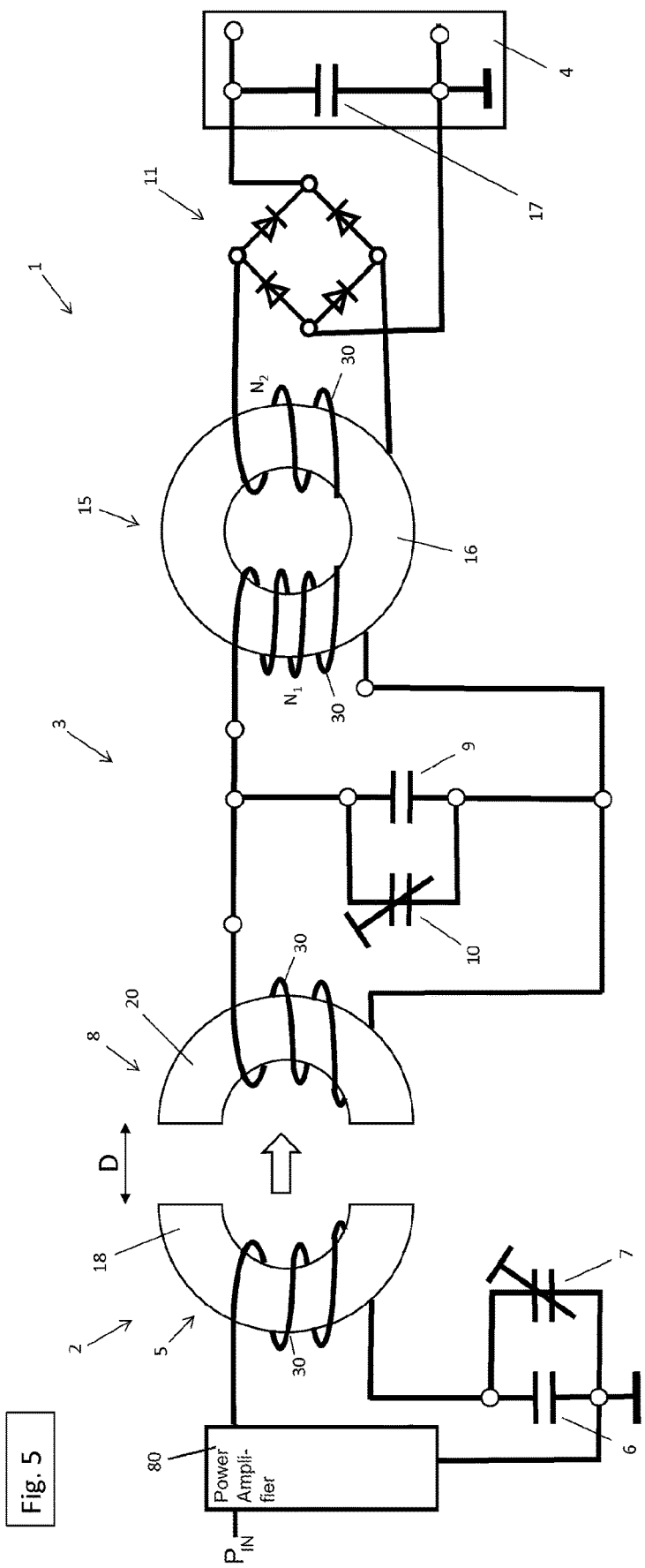
FIG. 5 shows a schematic circuit diagram in accordance with a fifth embodiment according to the invention, wherein the transmitter device comprises a series tank circuit and the receiver device comprises a series tank circuit, a transformer with a bridge rectifier and without a center tap being provided in the receiver device.

FIG. 5 illustrates a schematic circuit diagram of the apparatus 1 according to the invention in accordance with a fifth embodiment. In this case, the apparatus 1 in accordance with the fifth embodiment substantially corresponds to the apparatus 1 in accordance with the third embodiment illustrated in FIG. 3. In contrast to the apparatus 1 in accordance with the third embodiment, the rectifier 11 at the receiver device 3 in accordance with the fifth embodiment is configured in the form of a bridge rectifier instead of a double-pulse center-tap rectifier. This does not comprise a center tap at the transformer 15.

Figure 6:
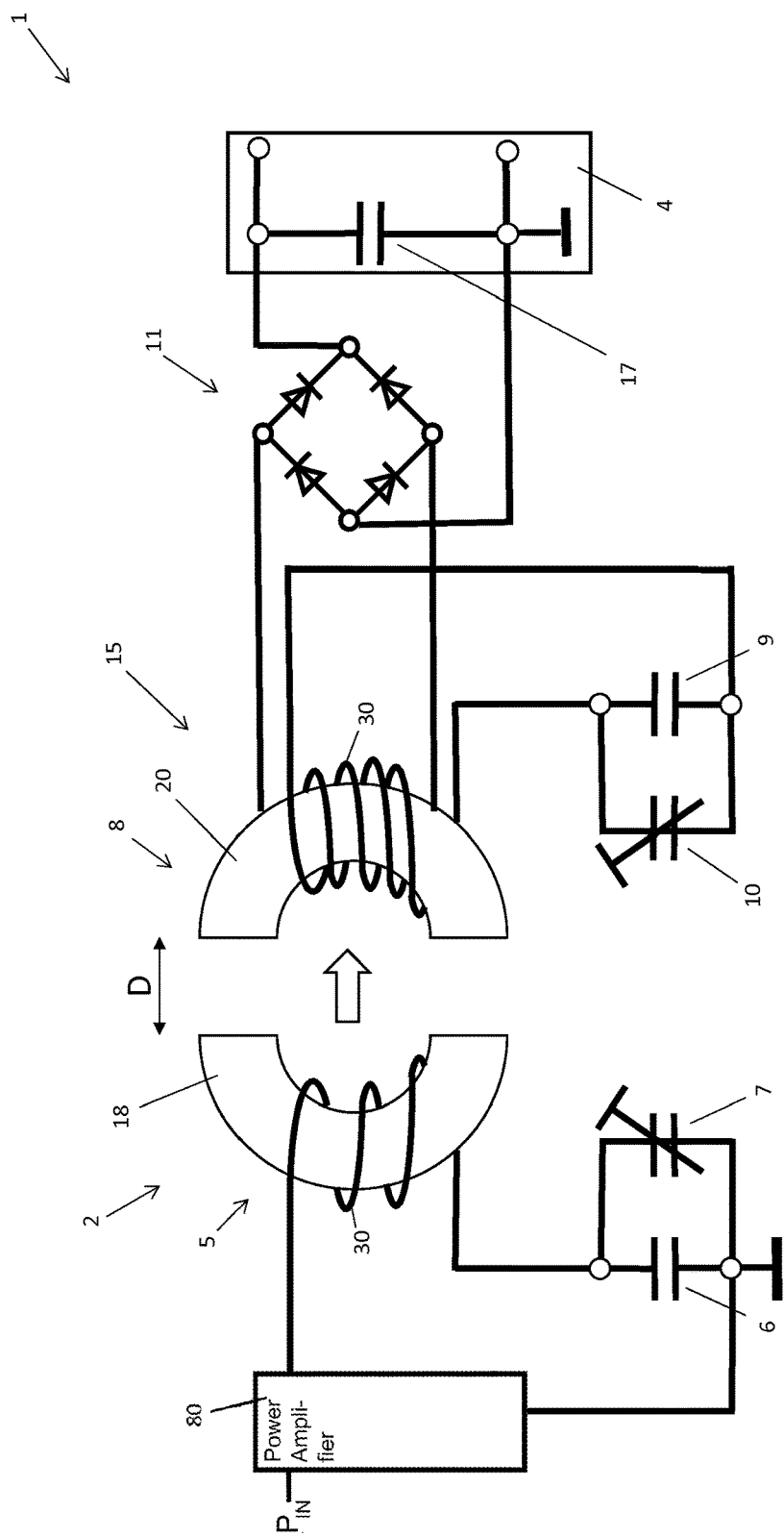
FIG. 6 shows a schematic circuit diagram in accordance with a sixth embodiment according to the invention, comprising a bridge rectifier, and a coil of the receiver device comprising the transformer.

FIG. 6 illustrates a schematic circuit diagram of the apparatus 1 according to the invention in accordance with a sixth embodiment. In this case, the apparatus 1 in accordance with the sixth embodiment substantially corresponds to the apparatus 1 in accordance with the first embodiment illustrated in FIG. 1. In contrast to the apparatus 1 in accordance with the first embodiment, the receiver device 3 in the apparatus 1 in accordance with the sixth embodiment comprises a transformer 15 without a separate or dedicated ferrite core. As can be gathered from FIG. 6, the ferrite core 20 of the second coil 8 of the receiver device 3 serves as the ferrite core of the transformer 15. As a result of dispensing with a separate ferrite core for the transformer 15, space and costs can be saved. Furthermore, the rectifier 11 of the apparatus 1 of the sixth embodiment is configured in the form of a bridge rectifier.

Figure 7:
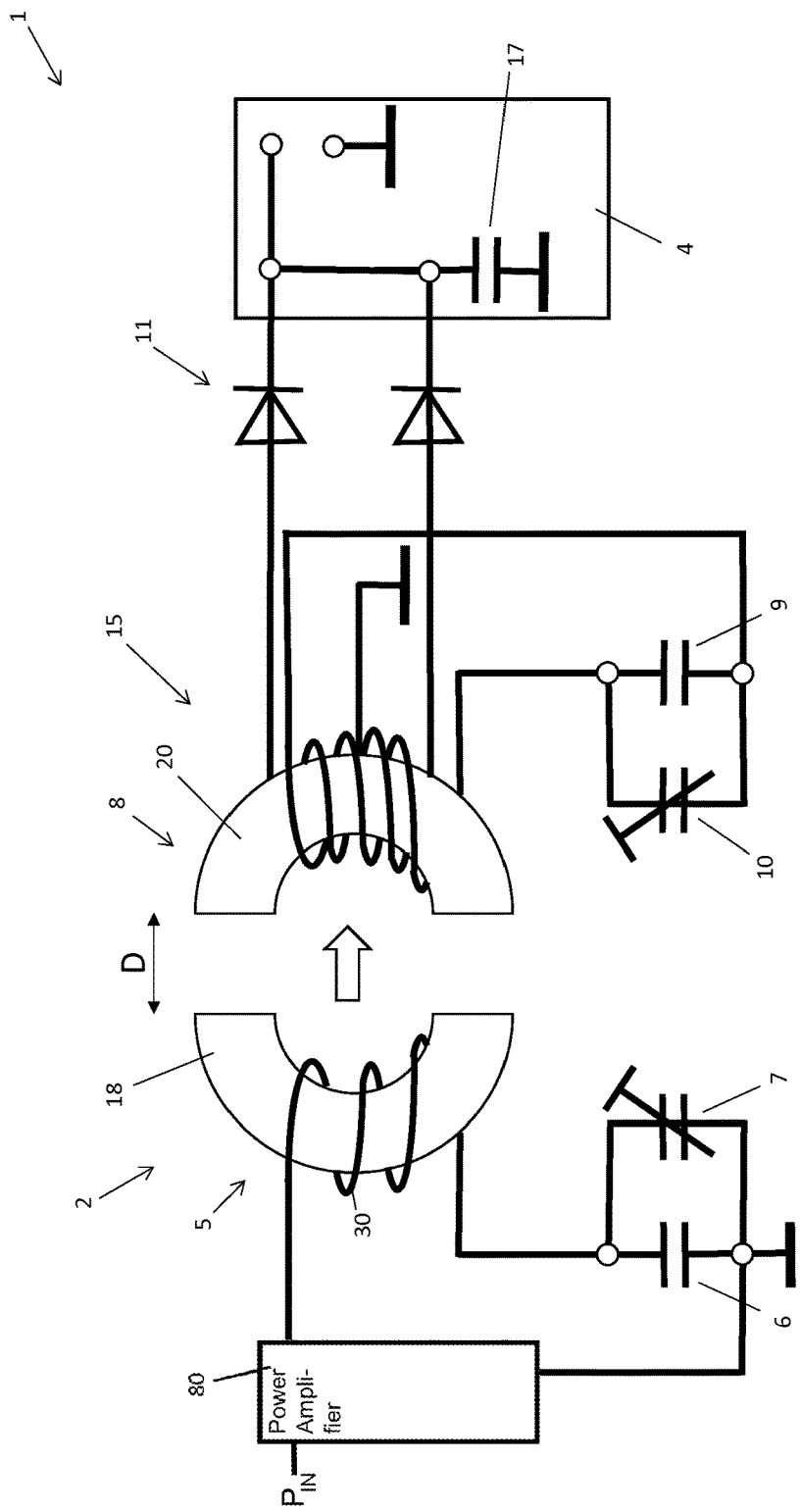
FIG. 7 shows a schematic circuit diagram in accordance with a seventh embodiment according to the invention, comprising a double-pulse center-tap rectifier and an integrated transformer.

FIG. 7 illustrates a schematic circuit diagram of the apparatus 1 according to the invention in accordance with a seventh embodiment. In this case, the apparatus 1 in accordance with the seventh embodiment substantially corresponds to the apparatus 1 in accordance with the sixth embodiment illustrated in FIG. 6. In contrast to the apparatus 1 in accordance with the sixth embodiment, the rectifier 11 of the receiver device 3 in accordance with the seventh embodiment is configured as a double-pulse center-tap rectifier instead of a bridge rectifier.

Figure 8:
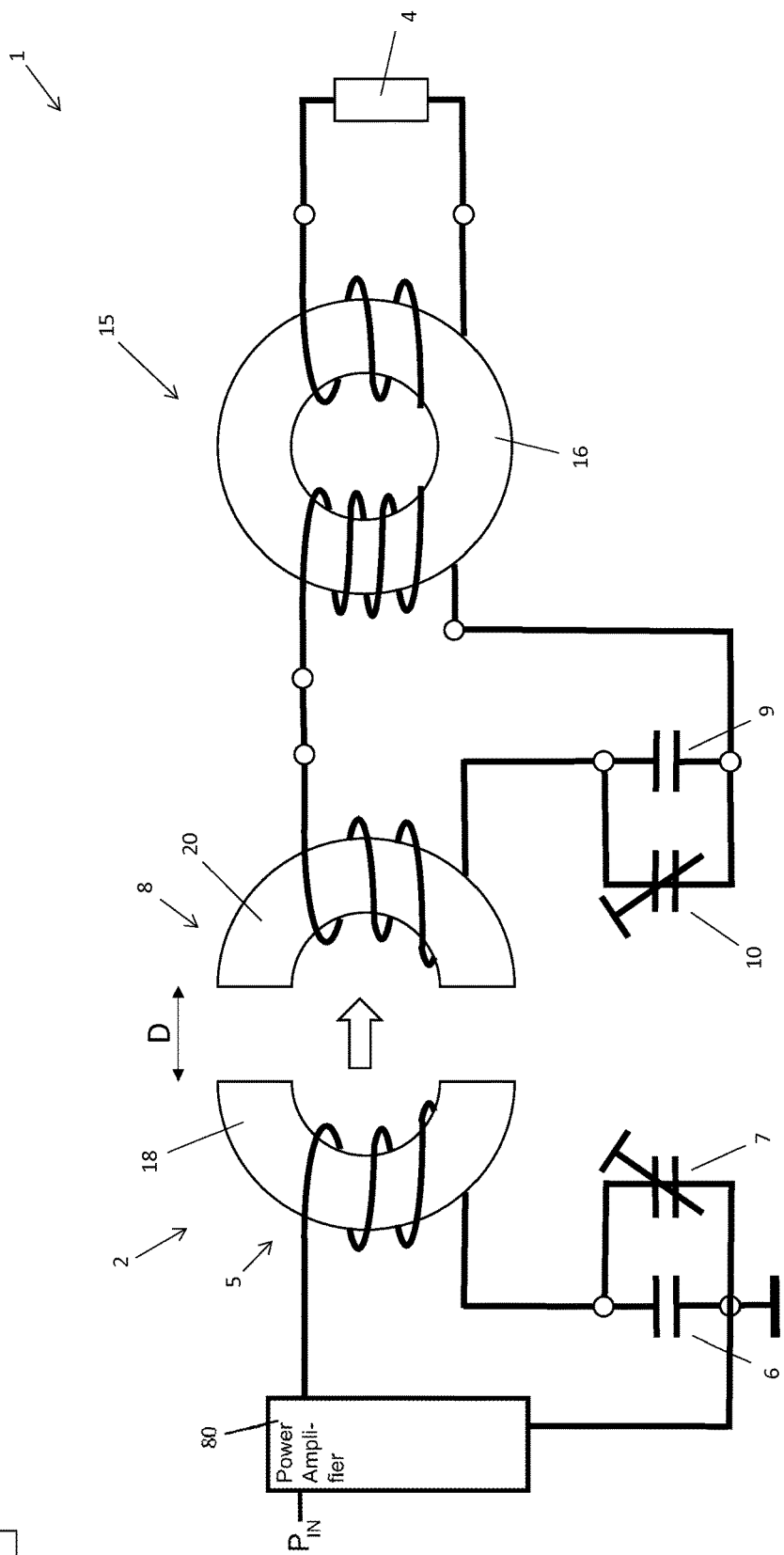
FIG. 8 shows a schematic circuit diagram in accordance with an eighth embodiment according to the invention, comprising a load in the form of an electrical resistor.

FIG. 8 illustrates a schematic circuit diagram of the apparatus 1 according to the invention in accordance with an eighth embodiment. In this case, the apparatus 1 in accordance with the eighth embodiment substantially corresponds to the apparatus 1 in accordance with the first embodiment illustrated in FIG. 1. In contrast to the apparatus 1 in accordance with the first embodiment, in the apparatus 1 in accordance with the eighth embodiment, the consumer 4 instead of a rectifier 11 is connected to the receiver device 3. In the apparatus 1 in accordance with the eighth embodiment, the consumer 4 is configured in the form of an electrical resistor.

In the case of the apparatus 1 in accordance with the first to eighth embodiments, the transmitter device 2 comprises a first trimming capacitor 7 and the receiver device 3 comprises a second trimming capacitor 10. However, it is also possible for only the transmitter device 2 to comprise a first trimming capacitor 7, and for the receiver device 3 not to comprise a trimming capacitor. Furthermore, it is also possible for only the receiver device 3 to comprise a trimming capacitor 10, and for the transmitter device 2 not to comprise a trimming capacitor. Moreover, it is also possible for neither the transmitter device 2 nor the receiver device 3 to comprise a trimming capacitor.

Furthermore, it is possible for the consumer 4 in accordance with the first to seventh embodiments to comprise a capacitor 17. In this case, the capacitor 17 can be configured as a ceramic capacitor or as an electrolytic capacitor (ELCA).

However, it is also possible, in accordance with an alternative embodiment, for the consumer 4 to comprise two capacitors. In this case, one of the two capacitors is configured as a ceramic capacitor and the other capacitor is configured as an electrolytic capacitor (ELCA). The two capacitors serve for smoothing the radio frequency and as a buffer for compensating for possible current fluctuations.

The wire material used for the construction of the coils and transformers must be RF-suitable (i.e. suitable for a radio frequency). For this purpose, correspondingly suitable litz wires or other suitable materials having an adequate behavior and purpose of use should be selected.

As indicated in the figures, the first coil 5 comprises a ferrite core 18 consisting of nickel-zinc (NiZn) having a resistivity of $10^5$ to $10^6$ Ωm and a magnetic permeability of 125. However, it is also possible, in accordance with further embodiments, for the magnetic permeability to be between 50 and 500, or in particular between 80 and 200.

As indicated in the figures, the second coil 8 also comprises a ferrite core 20 consisting of nickel-zinc (NiZn) likewise having a resistivity of $10^5$ to $10^6$ Ωm and a magnetic permeability of 125.

The ferrite core 18 of the first coil 5 and the ferrite core 20 of the second coil 8 are configured in a U-shaped fashion and have a cross-sectional area of 5.65 cm², with the result that a power density of 35 W/cm² for an input power of 200 W is achieved during the transfer of the electrical energy.

As illustrated in FIGS. 9 to 15, the ferrite core 18 of the first coil 5 and the ferrite core 20 of the second coil 8 can be configured in various shapes. In this case, the ferrite core 18 of the first coil 5 and the ferrite core 20 of the second coil 8 are always arranged with respect to one another in the apparatus 1 according to the invention such that the field emission of the respective ferrite core 18, 20 is directed relative to one another.

Figure 9:
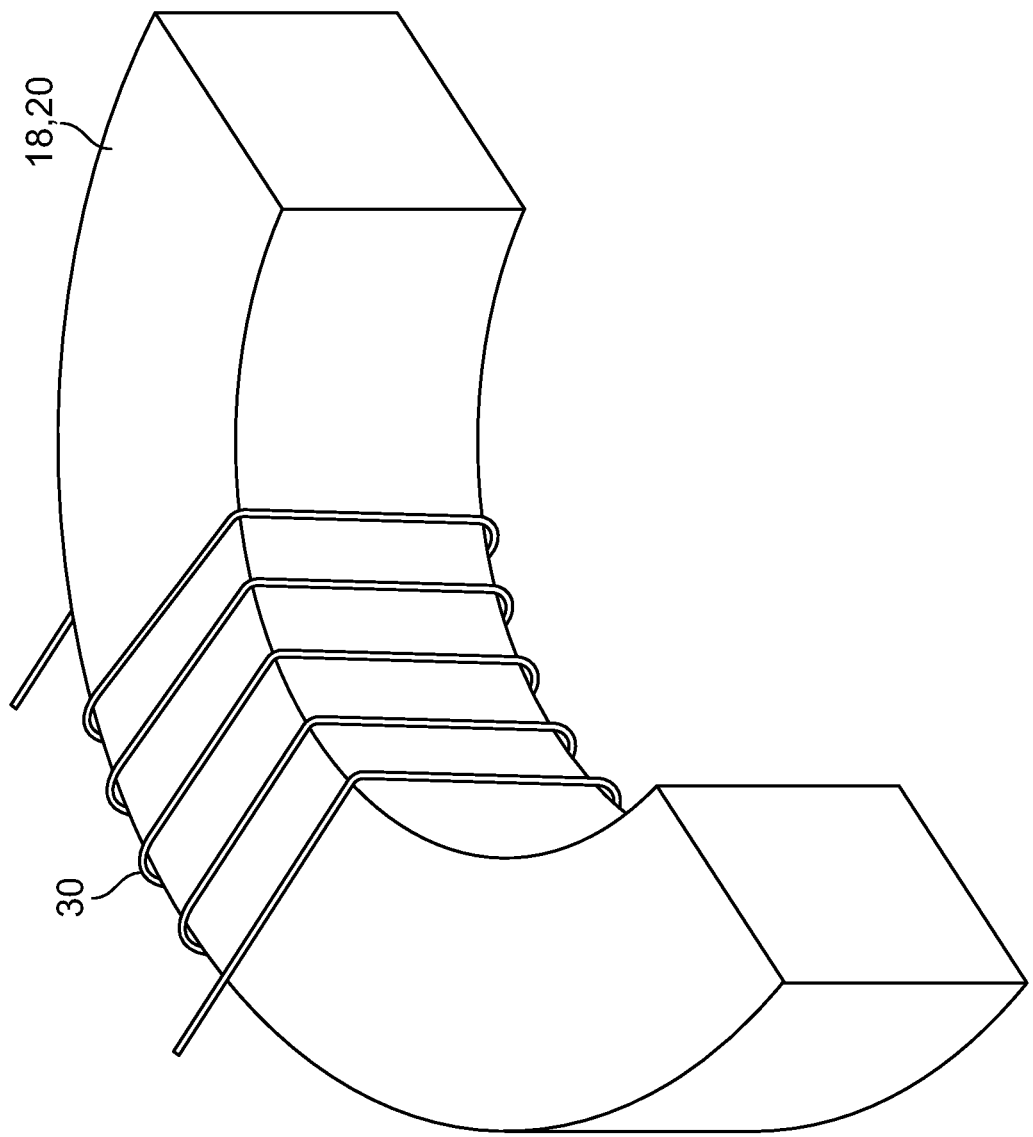
FIG. 9 shows a ferrite core of the first and/or the second coil in a first configuration.

In FIG. 9 here the ferrite core 18, 20 of the first and/or second coil 5, 8 in accordance with a first configuration is configured in a U-shape. A wire 30 for the winding of a coil is wound around the respective ferrite core 18, 20.

Figure 10:
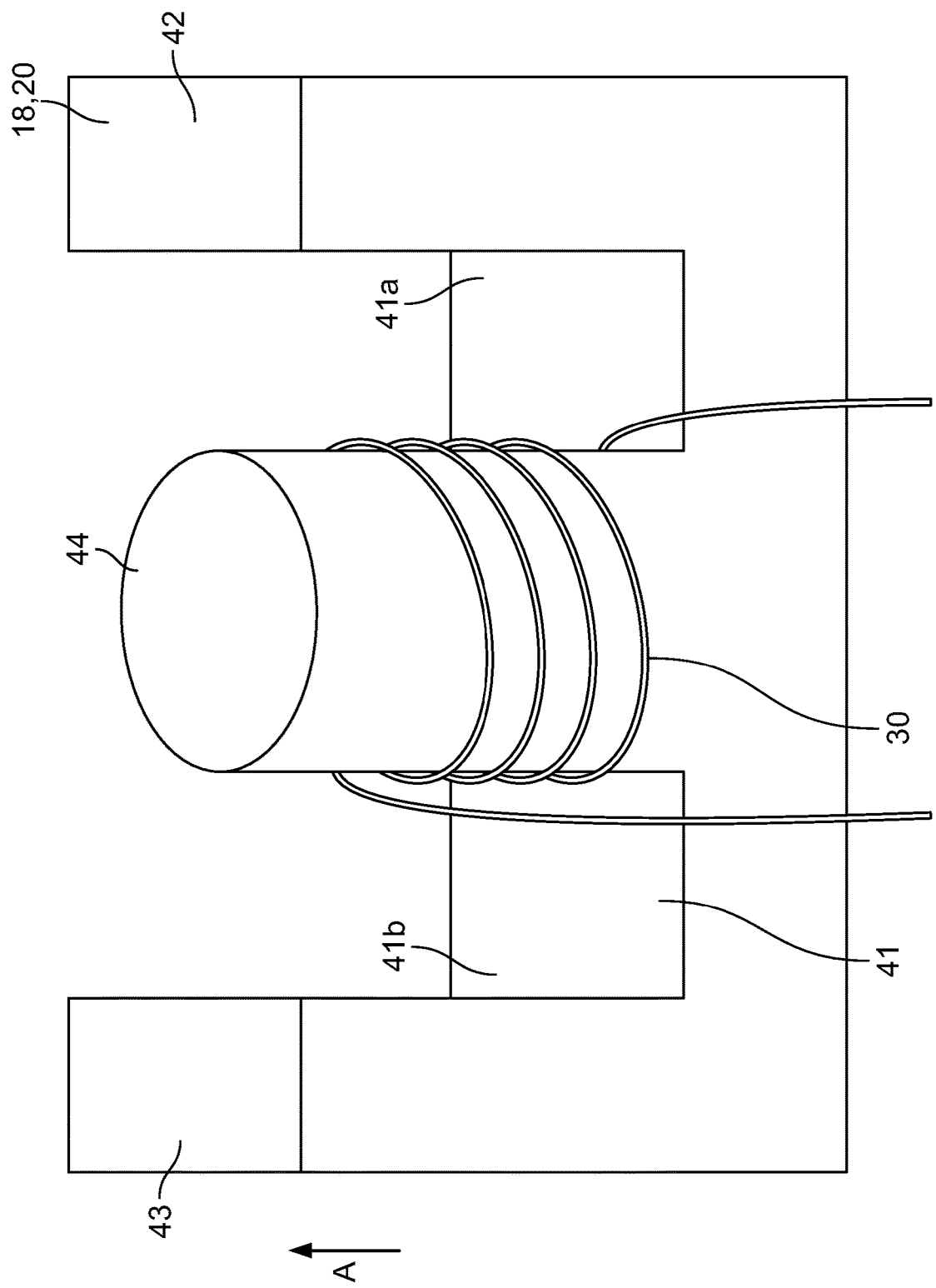
FIG. 10 shows the ferrite core of the first and/or the second coil in a second configuration.

FIG. 10 shows the ferrite core 18, 20 in accordance with a second configuration. In this case, the ferrite core 18, 20 in accordance with the second configuration substantially comprises a base web 41, from which a first and a second web 42, 43 extend perpendicular to the base web 41 at the respective ends 41a, 41b of the base web 41. Furthermore, between the first and second webs 42, 43, a third web 44 extends perpendicular to the base web 41. The first, second and third webs 42, 43, 44 extend in the same direction A. The third web 44 has a round cross section. The second and third webs 42, 43 have a rectangular cross section.

Figure 11:
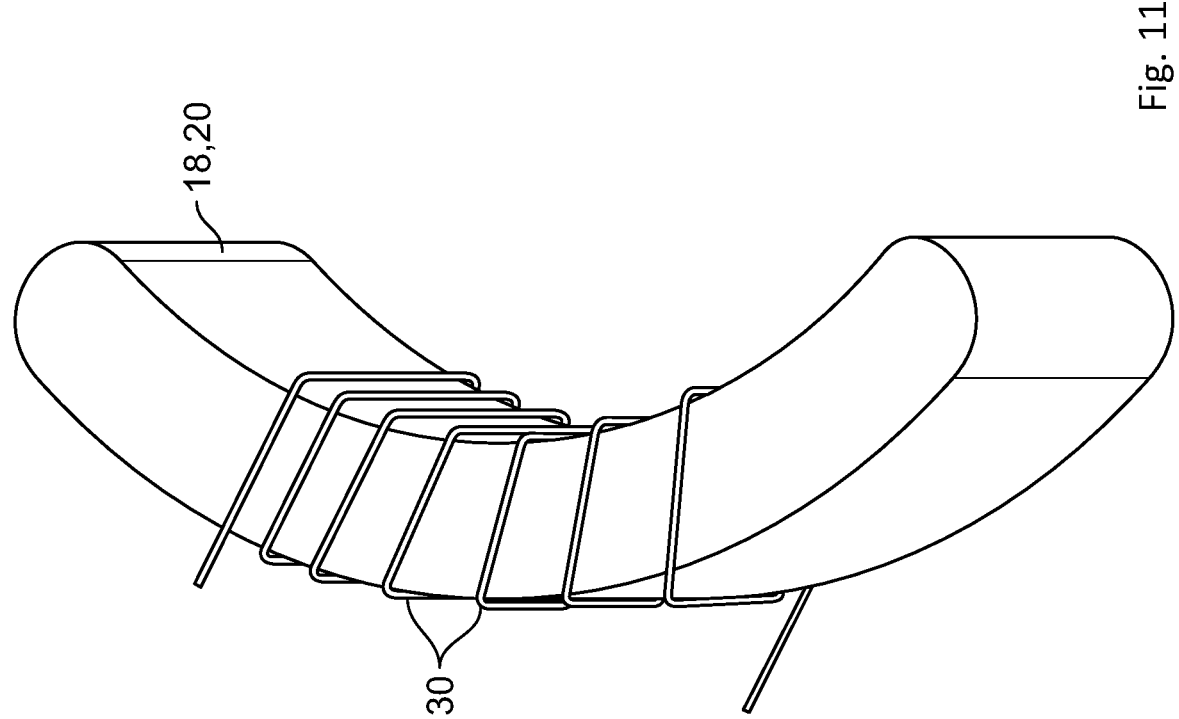
FIG. 11 shows the ferrite core of the first and/or the second coil in a third configuration.

FIG. 11 shows the ferrite core 18, 20 in accordance with a third configuration. The ferrite core 18, 20 in accordance with the third configuration has a curved shape and in this case is configured such that it is substantially straighter than in the first configuration.

Figure 12:
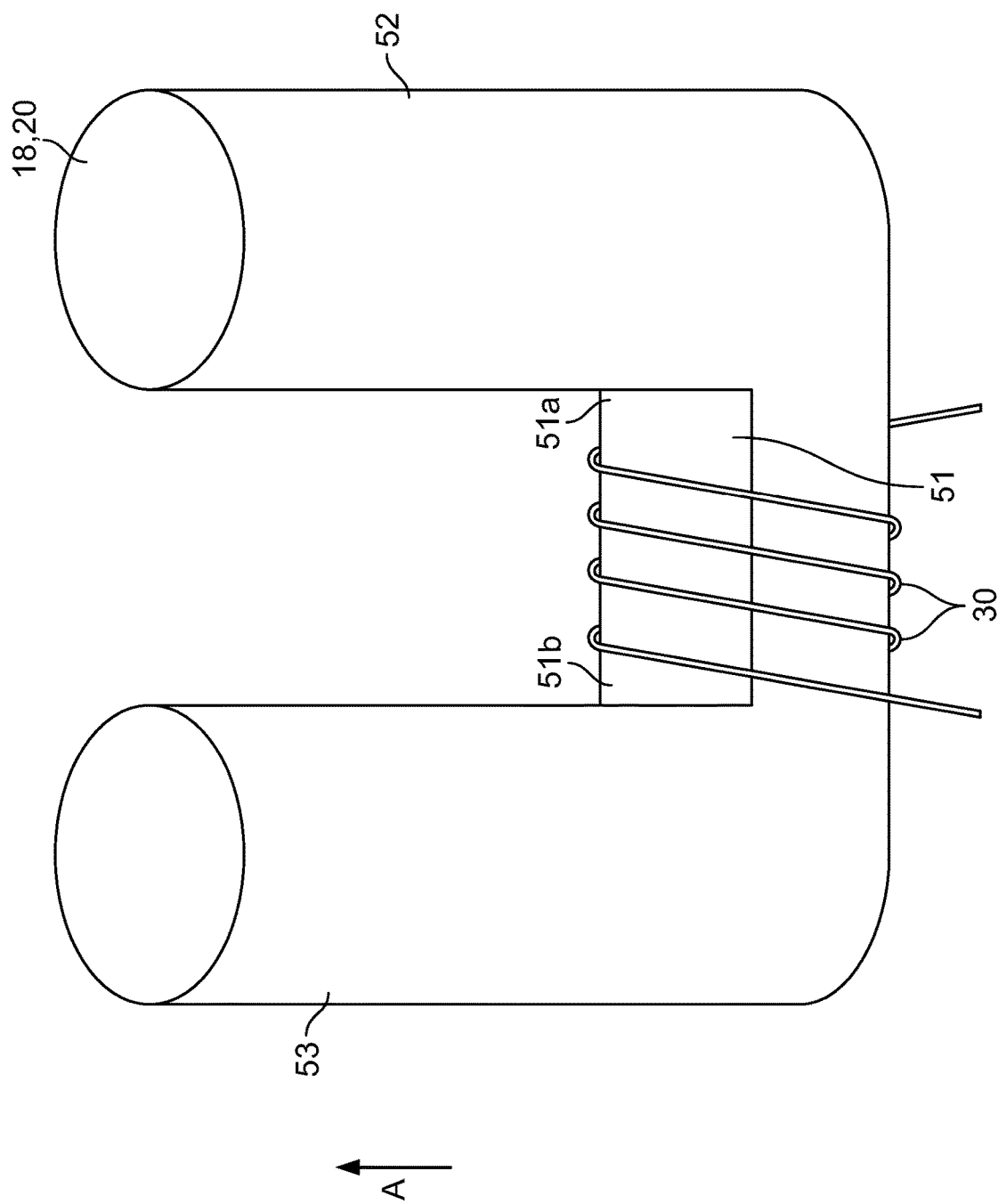
FIG. 12 shows the ferrite core of the first and/or the second coil in a fourth configuration.

FIG. 12 shows the ferrite core 18, 20 in accordance with a fourth configuration. In this case, the ferrite core 18, 20 in accordance with the fourth configuration substantially comprises a base web 51, from which a first web 52 and a second web 53 extend perpendicular to the main web 51 in direction A at the respective ends 51a, 51b of the base web 51. The first and second webs 52, 53 have a circular cross section.

Figure 13:
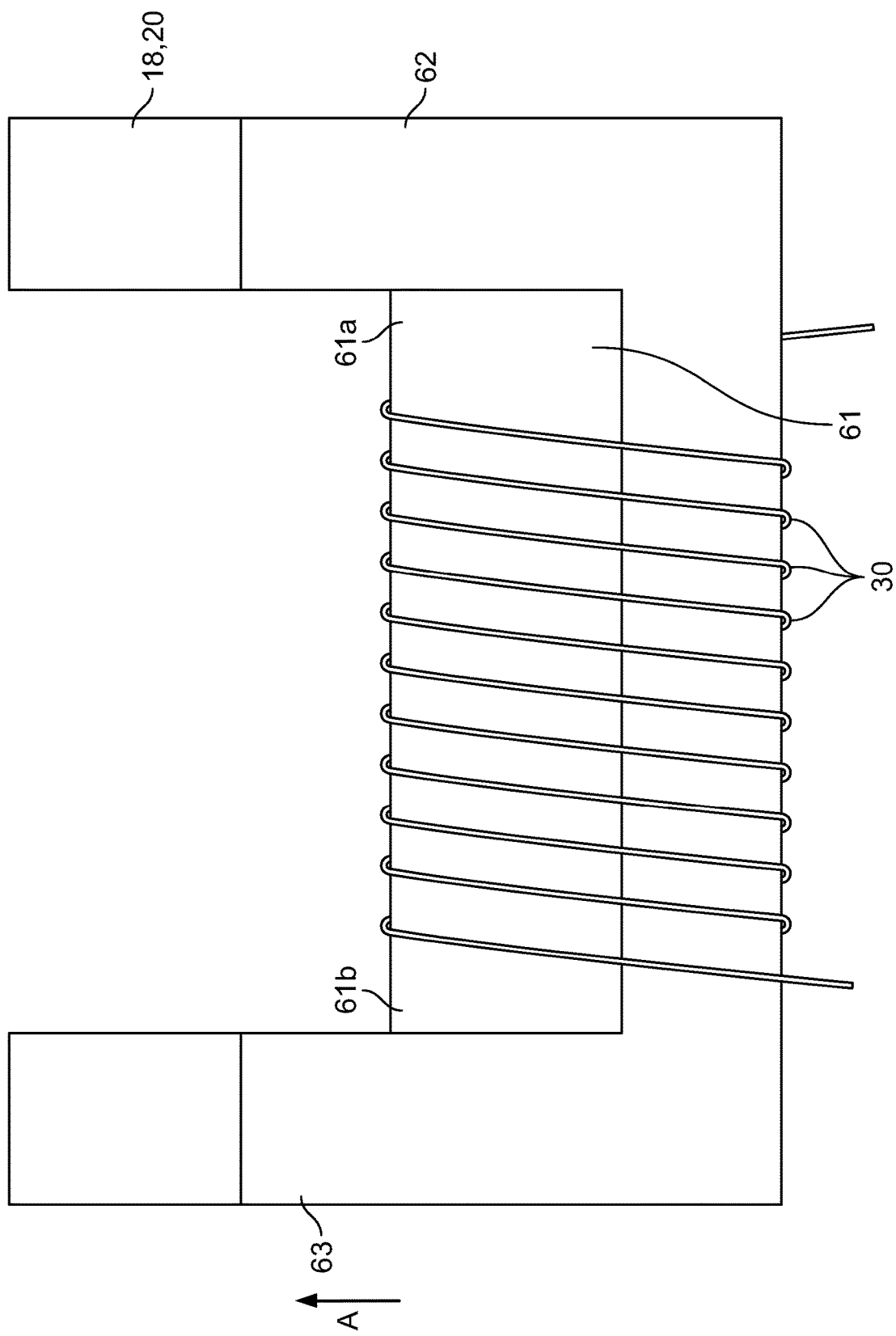
FIG. 13 shows the ferrite core of the first and/or the second coil in a fifth configuration.

FIG. 13 shows the ferrite core 18, 20 in accordance with a fifth configuration. In this case, the ferrite core 18, 20 in accordance with the fifth configuration substantially comprises a base web 61, from which a first web 62 and a second web 63 extend perpendicular to the main web 61 in direction A at the respective ends 61a, 61b of the base web 61. The first and second webs 62, 63 have a rectangular cross section.

Figure 14:
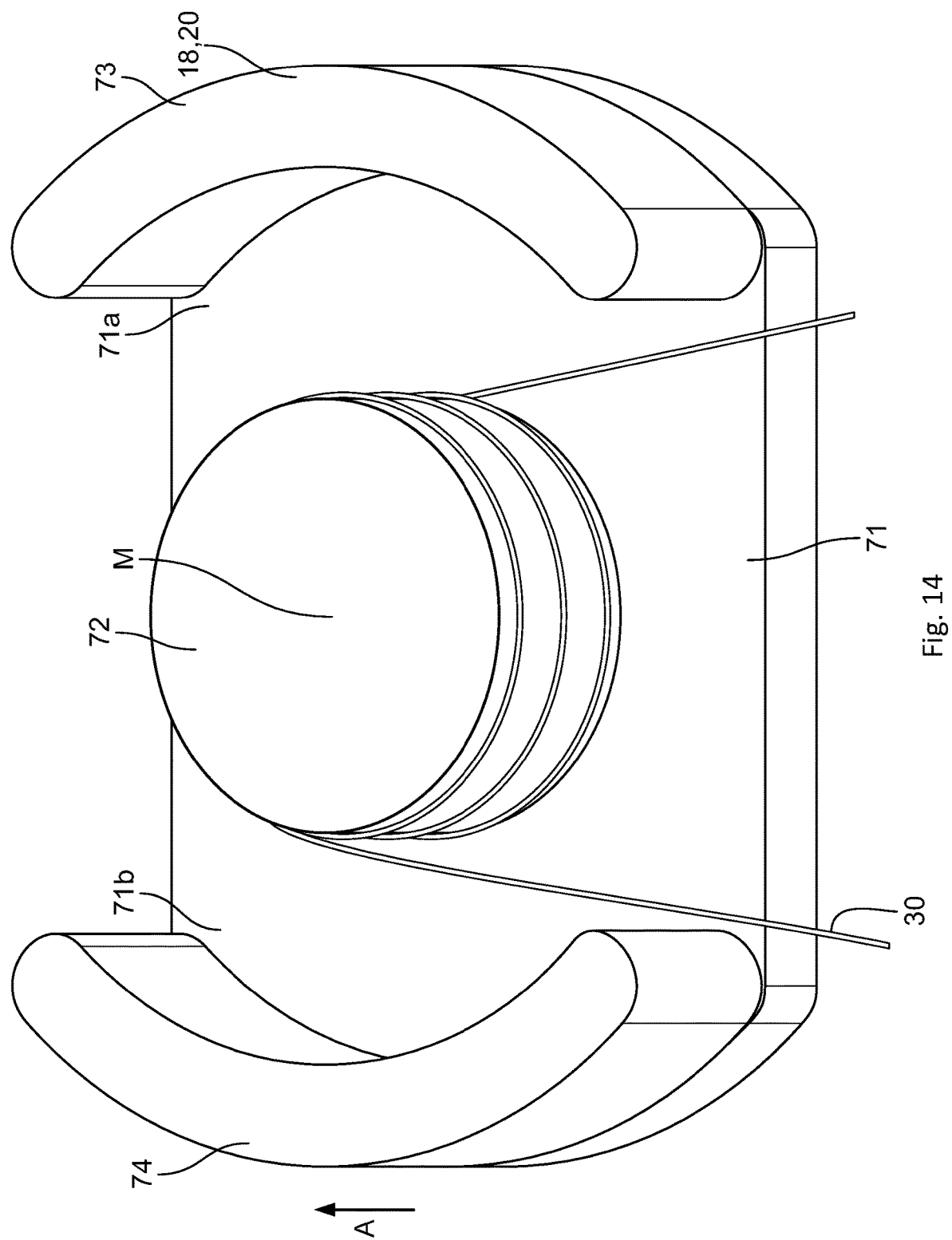
FIG. 14 shows the ferrite core of the first and/or the second coil in a sixth configuration with a first winding arrangement.

FIG. 14 shows the ferrite core 18, 20 in accordance with a sixth configuration. In this case, the ferrite core 18, 20 in accordance with the sixth configuration comprises a baseplate 71 having a cylindrical elevation 72 in the center M. A first arcuate elevation 73 is positioned at a first end 71a of the baseplate 71 and a second arcuate elevation 74 is positioned at a second end 71b of the baseplate 71. In this case, the first and second elevations 73, 74 are arranged on the baseplate 71 such that the respective concave surfaces of the two arcuate elevations 73, 74 are directed toward one another. The cylindrical elevation on the baseplate 71 is positioned between the two arcuate elevations 73, 74. All three elevations 72, 73, 74 extend from the baseplate 71 in the same direction A. As evident in FIG. 14, the wire 30 for the winding of a coil is wound in accordance with a first winding arrangement around the cylindrical elevation in the center M.

Figure 15:
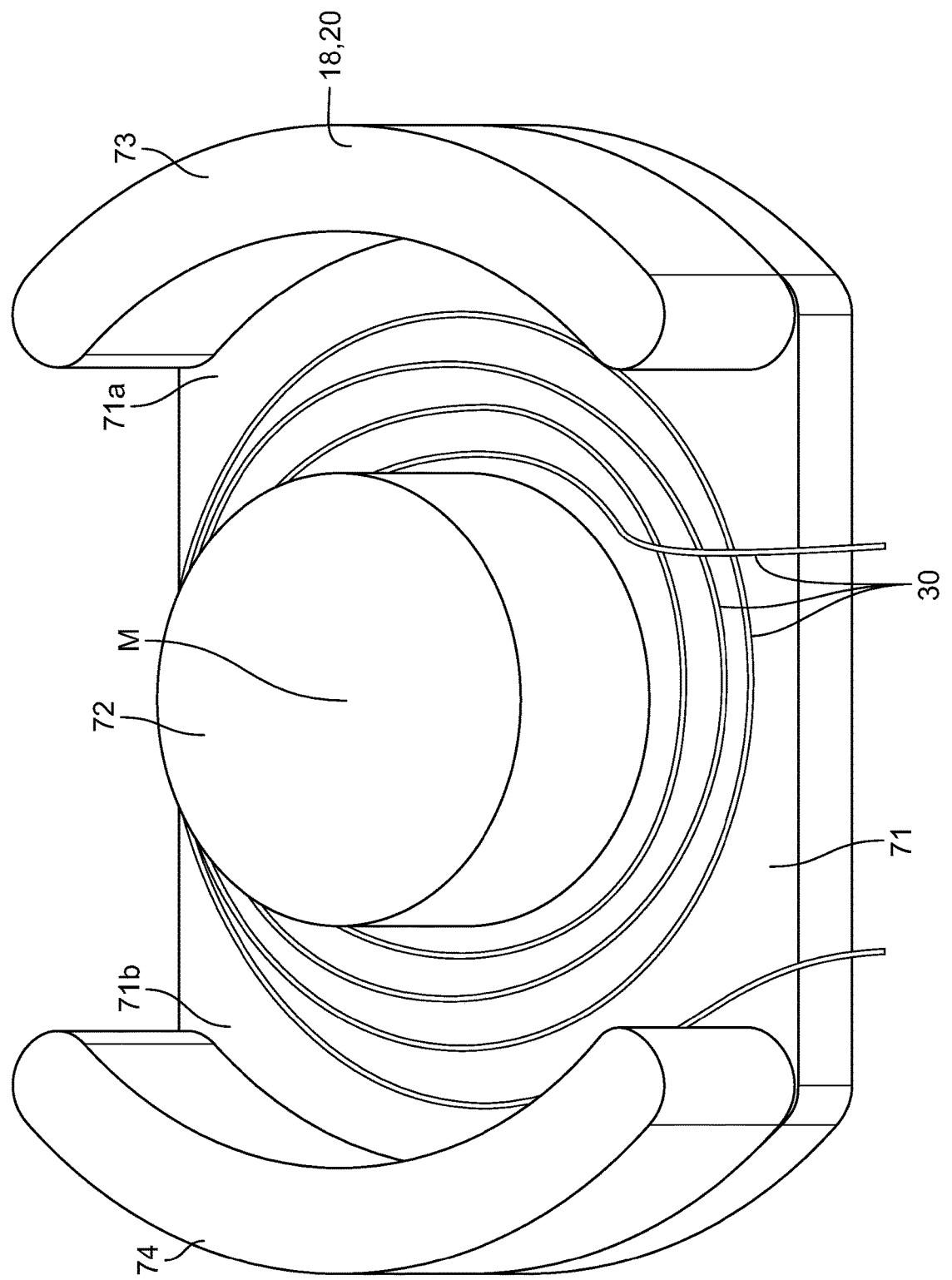
FIG. 15 shows the ferrite core of the first and/or the second coil in the sixth configuration with a second winding arrangement.

FIG. 15 illustrates the ferrite core 18, 20 in accordance with the sixth configuration. The wire 30 for the winding of a coil is wound spirally in accordance with a second winding arrangement on the baseplate 71.

Generally, it is possible for various winding arrangements around or at the ferrite cores 18, 20 to be possible. It is possible here for the wire 30 for the winding of a coil to be arranged in only one plane or alternatively in a plurality of planes, i.e. a plurality of layers of wire 30 one above another. A monolayer arrangement of the windings, subdivided into a plurality of groups, is also possible here in order for example to reduce parasitic winding capacitances.

As can be gathered from FIGS. 1 to 8, a distance D extends between the first coil 5 of the transmitter device 2 and the second coil 8 of the receiver device 3. The distance D is approximately 40 mm.

A power amplifier 80 at the transmitter device 2 serves here as a clock generator for the frequency of the resonant tank circuit at the transmitter device 2. The power amplifier is connected to an AC voltage source for this purpose. The AC voltage source, which can also be referred to as current source or voltage source, is not illustrated and is merely indicated by $P_{IN}$ in the figures. In this case, depending on the application, the power amplifier 80 can be configured so as to produce together with the AC voltage source either a low-impedance or a high-impedance energy resource at the transmitter device 2 for the resonant tank circuit at the transmitter device 2.

In order to transfer an electrical energy from the transmitter device 2 to the receiver device 3, electrical energy in the form of AC current is then passed from the AC voltage source $P_{IN}$ via the power amplifier 80 with a frequency of 6.78 MHz into the first coil 5. The first coil 5 and the first capacitor 6 produce a resonant tank circuit having an inductance of 1.58 pH and an electrical capacitance of $349 \times 10^{-12}$ F.

By virtue of the fact that the resonant tank circuit in the transmitter device 2 is highly resonant, the electrical energy situated in this tank circuit decreases only relatively slowly over a high number of cycles. By virtue of the arrangement according to the invention of the transmitter device 2 with respect to the receiver device 3, a relatively large portion of the electrical energy can be transferred from the resonant tank circuit at the transmitter device 2 to the resonant tank circuit at the receiver device 3.

As a result of the specific configuration of the first coil 5 of the transmitter device 2 and the second coil 8 of the receiver device 3, an inductive coupling occurs. The coupled electric fields of the at the two coils 5, 8 are so-called non-radiative near fields, which can also be referred to as evanescent waves.

Since the distance between the coils 5, 8 is chosen such that it is within the spacing of ¼ wavelengths, a large portion of the electrical energy is transmitted, i.e. with only low losses, from the first coil 5 of the transmitter device 2 to the second coil 8 of the receiver device 3.

By virtue of a correspondingly chosen ratio of the turns $N_1$, $N_2$ at the transformer 15, besides impedance matching, additionally it is also possible to set a suitable magnitude of the electrical voltage, such that the consumer can be correspondingly supplied with electrical voltage. A typical output voltage range is between 3 $V_{DC}$ (DC voltage) and 500 $V_{DC}$ (DC voltage).

What is claimed is:

1. An apparatus for transmitting electrical energy to at least one electrical consumer, the apparatus comprising:
    at least one transmitter for transmitting an electrical energy having at least one first coil and at least one first capacitor for producing a resonant tank circuit at the transmitter;
    at least one receiver for receiving the energy transmitted by the transmitter, the receiver including at least one second coil and at least one second capacitor for producing a resonant tank circuit at the receiver, wherein the receiver is connectable to the consumer to form an electrical connection;
    a power amplifier;
    a transformer for matching an impedance between the resonant tank circuit at the receiver and the consumer; and
    an electrical energy source for supplying the resonant tank circuit at the transmitter with electrical energy;
    the transmitter and the receiver jointly forming a series resonant tank circuit for transferring the electrical energy from the transmitter to the receiver, such that at the receiver the electrical energy made available by the transmitter can be fed to the consumer
    the power amplifier being located between the electrical energy source and the at least one first coil for amplifying power provided by the electrical energy source to the at least one first coil;
    wherein the electrical energy source is an AC voltage source.

2. The apparatus as recited in claim 1 wherein the first coil and the first capacitor of the transmitter are connected in parallel with one another in order to produce a parallel resonant tank circuit at the transmitter.

3. The apparatus as recited in claim 1 wherein the second coil and the second capacitor of the receiver are connected in parallel with one another in order to produce a parallel resonant tank circuit at the receiver.

4. The apparatus as recited in claim 1 wherein both the first and the second coil contain a ferrite core having a resistivity of $10^5$ to $10^6$ $\Omega$m and also a magnetic permeability of 50 to 500.

5. The apparatus as recited in claim 4 wherein both the first and the second coil contain a ferrite core having a magnetic permeability of 125.

6. The apparatus as recited in claim 4 wherein the ferrite core at least partly contains nickel-zinc alloy.

7. The apparatus as recited in claim 4 wherein the ferrite core is configured in a U-shaped fashion and has an active cross-sectional area of 2 to 10 cm², such that a power density of 10 to 100 W/cm² for an input power of 3 to 1000 W is achievable during the transfer of the electrical energy from the transmitter to the receiver.

8. The apparatus as recited in claim 7 wherein the ferrite core has an active cross-sectional area of 5.65 cm², such that a power density of 35 W/cm², for an input power of 200 W, is achievable during the transfer of the electrical energy from the transmitter to the receiver.

9. The apparatus as recited in claim 1 wherein a frequency of the resonant tank circuit at the transmitter is between 2 and 30 MHz.

10. The apparatus as recited in claim 9 wherein a frequency of the resonant tank circuit at the transmitter is between 6.765 and 6.795 MHz.

11. The apparatus as recited in claim 10 wherein a frequency of the resonant tank circuit at the transmitter is 6.78 MHz.

12. The apparatus as recited in claim 1 wherein the transmitter or the receiver includes a variable capacitor for tuning a resonant frequency.

13. The apparatus as recited in claim 12 wherein the variable capacitor is a trimmer capacitor.

14. The apparatus as recited in claim 1 wherein the electrical consumer is a rechargeable battery.

15. The apparatus as recited in claim 12 wherein the transmitter includes the variable capacitor for tuning a resonant frequency.

16. The apparatus as recited in claim 12 wherein the receiver includes the variable capacitor for tuning a resonant frequency.

17. The apparatus as recited in claim 1 wherein the power amplifier serves as a clock generator.

18. The apparatus as recited in claim 1 wherein the power amplifier is connected to the first capacitor, the first capacitor being in parallel with the first coil.

19. The apparatus as recited in claim 9 wherein the power amplifier is directly connected to the first capacitor and the first coil.

* * * * *